(12) United States Patent
Gerard

(10) Patent No.: US 10,787,388 B2
(45) Date of Patent: Sep. 29, 2020

(54) METHOD FOR IMPREGNATING A FIBROUS SUBSTRATE WITH A METHACRYLIC MIXTURE COMPRISING A FLAME-RETARDANT SUBSTANCE

(71) Applicant: Arkema France, Colombes (FR)

(72) Inventor: Pierre Gerard, Denguin (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/579,725

(22) PCT Filed: Jun. 6, 2016

(86) PCT No.: PCT/FR2016/051344
§ 371 (c)(1),
(2) Date: Dec. 5, 2017

(87) PCT Pub. No.: WO2016/193645
PCT Pub. Date: Dec. 8, 2016

(65) Prior Publication Data
US 2018/0179105 A1    Jun. 28, 2018

(30) Foreign Application Priority Data
Jun. 5, 2015 (FR) ........................ 15 55172

(51) Int. Cl.
| | | |
|---|---|---|
| C03C 25/285 | (2018.01) | |
| C08K 3/016 | (2018.01) | |
| C09D 133/12 | (2006.01) | |
| B29C 33/68 | (2006.01) | |
| B29C 70/22 | (2006.01) | |
| B29C 70/42 | (2006.01) | |
| C03C 25/1095 | (2018.01) | |
| C03C 25/42 | (2006.01) | |
| C03C 25/64 | (2006.01) | |
| B29K 33/00 | (2006.01) | |
| B29K 309/08 | (2006.01) | |

(52) U.S. Cl.
CPC ............ *C03C 25/285* (2013.01); *B29C 33/68* (2013.01); *B29C 70/22* (2013.01); *B29C 70/42* (2013.01); *C03C 25/1095* (2013.01); *C03C 25/42* (2013.01); *C03C 25/64* (2013.01); *C08K 3/016* (2018.01); *C09D 133/12* (2013.01); *B29K 2033/12* (2013.01); *B29K 2309/08* (2013.01); *B29K 2313/00* (2013.01); *B29K 2879/08* (2013.01); *B29K 2905/12* (2013.01); *B29K 2995/0016* (2013.01); *C03C 2218/11* (2013.01); *C08L 2201/02* (2013.01)

(58) Field of Classification Search
CPC ....... C03C 25/285; C03C 25/64; C03C 25/42; C03C 25/1095; C03C 2218/11; B29C 70/42; B29C 70/22; B29C 33/68; B29K 2995/0016; B29K 2905/12; B29K 2879/08; B29K 2313/00; B29K 2309/08; B29K 2033/12; C08K 3/016; C08L 2201/02; C09D 133/12
See application file for complete search history.

(56) References Cited

U.S. PATENT DOCUMENTS

| | | |
|---|---|---|
| 6,138,834 A | 10/2000 | Southall |
| 2008/0127431 A1 | 6/2008 | Harz et al. |
| 2008/0241452 A1* | 10/2008 | Kondo ................... B32B 7/12 428/40.1 |
| 2016/0032080 A1 | 2/2016 | Gerard et al. |

FOREIGN PATENT DOCUMENTS

DE    299479    4/1992

OTHER PUBLICATIONS

PubChem, Aluminum Diethylphosphinate, 2019. https://pubchem.ncbi.nlm.nih.gov/compound/Aluminum-Diethylphosphinate. pp. 1-2. (Year: 2019).*
Polymer Science Learning Center, Emulsion Polymerization, 2019. https://pslc.ws/macrog/emulsion.htm (Year: 2019).*

* cited by examiner

*Primary Examiner* — Hai Y Zhang
(74) *Attorney, Agent, or Firm* — Thomas F. Roland

(57) ABSTRACT

The present invention relates to a (meth)acrylic mixture for impregnating a fibrous substrate, characterized in that it comprises: a) a first dispersion comprising at least one (meth)acrylic polymer obtained by emulsion polymerization of one or more (meth)acrylic monomers, b) a second dispersion comprising at least one flame retardant. The invention also relates to a method for impregnating a fibrous substrate with a (meth)acrylic mixture of this kind, and to a method for manufacturing mechanical parts or structured elements, or articles, from the (meth)acrylic mixture. Another objective of the invention is a mechanical part or a structured element or an article made of composite material, obtained by the implementation of the manufacturing method.

8 Claims, No Drawings

METHOD FOR IMPREGNATING A FIBROUS SUBSTRATE WITH A METHACRYLIC MIXTURE COMPRISING A FLAME-RETARDANT SUBSTANCE

This application claims benefit, under U.S.C. § 119 or § 365 of PCT Application Number PCT/FR2016/051344, filed Jun. 6, 2016, and French Patent Application Number FR1555172, filed Jun. 5, 2015, these documents being incorporated herein by reference.

The invention relates to a method for impregnating a fibrous substrate, to a flame-retardant mixture based on (meth)acrylic polymer for impregnating a fibrous substrate, and to the impregnated fibrous substrate obtained by the implementation of the impregnating method.

A method of this kind in particular allows the manufacture of three-dimensional parts, as for example mechanical parts or mechanical-part assemblies, which exhibit great resistance to fire. When a fire occurs, for example, the flame-retardant mixture promotes carbonization of the parts, retards inflammation, and minimizes the damage. Such parts or assemblies of parts are used in a variety of fields such as aeronautics, automotive, rail transport, or else construction.

PRIOR ART

Some parts or assemblies of parts, such as those mentioned above, are sometimes subjected to high mechanical stresses or mechanical forces. Such parts are hence very widely manufactured from composite materials.

A composite material is an assembly of at least two immiscible components. A synergistic effect is obtained by such an assembly, such that the composite material obtained has properties, especially mechanical and/or thermal properties, that each of the initial components does not have, or does have but to a lesser extent than the composite material.

Moreover, a composite material consists of at least one reinforcing material, conferring good mechanical properties on said composite material, in particular good resistance to the mechanical forces experienced by the composite material, and of a matrix material forming a continuous phase and ensuring the cohesion of said composite material. Among the different types of composites used in industry, composites containing organic matrices are the most common. In the case of composites containing organic matrices, the matrix material is generally a polymer. This polymer may be either a thermosetting polymer or a thermoplastic polymer.

The composite material is prepared by mixing the matrix material and the reinforcing material, or by wetting or impregnating the reinforcing material with the matrix material, then by polymerizing the resulting system. In the case of the mixing of the matrix and the reinforcer, said reinforcer may consist of reinforcing fillers such as gravel, sand, or glass beads. In the case of the wetting or impregnation of the reinforcer with the matrix, said reinforcer may consist of fibers of variable dimensions.

The polymer matrix may comprise fillers in order to give specific properties to the final composite material. Such properties may be ultraviolet (UV) resistance, fire resistance, or else impact resistance. However, it is well known to the skilled person that the addition of fillers within the polymer matrix tends to increase its viscosity, so making it very difficult, or in certain cases even impossible, to impregnate the reinforcer with said polymer matrix.

Document FR 3 002 943 proposes a solution to the problem of the sharp increase in viscosity when flame-retardant fillers are added. Said document describes a liquid (meth)acrylic syrup for impregnating a fibrous substrate consisting of long fibers. The liquid (meth)acrylic syrup comprises a (meth)acrylic polymer, a (meth)acrylic monomer, and a flame retardant. The composition of the syrup and the amount of flame retardant, of less than 50% by weight, relative to the total weight of (meth)acrylic syrup, makes it possible to produce a (meth)acrylic syrup whose viscosity is less than 10 000 mPa·s.

Document DD 299 479 describes a process for producing a flame-retardant fabric by coating and/or impregnating the fabric with a flame-retardant binder. The binder is a latex mixture (diene and/or acrylic type) in which is added under stirring a flame retardant in solid or liquid form.

However, it is often useful to have an alternative when impregnating the fibrous substrate, with regard to the polymer matrix impregnating said fibrous substrate, especially when an injection machine is not suitable for injecting a polymer matrix of this kind based on a liquid syrup, or when the particle size of the flame-retardant fillers that is necessary for obtaining optimum impregnation of the fibrous substrate is required to reach particularly low value ranges.

Technical Problem

The aim of the invention is therefore to overcome the drawbacks of the prior art by proposing a method for impregnating a fibrous substrate with a mixture comprising a thermoplastic (meth)acrylic polymer, said mixture having a flame-retardant character and a viscosity sufficiently low to allow optimum impregnation of the fibrous substrate without porosity and homogeneously.

The invention also aims to propose a (meth)acrylic mixture in which the size of the particles is very low (low particle size), thus permitting optimum impregnation of the fibrous substrate.

Another objective of the invention is to propose a part made from composite material in which the polymer matrix comprises a flame retardant which adheres excellently to said composite-material part.

The invention aims, furthermore, to propose parts made of composite material which are obtained by the impregnating method and possess good mechanical properties.

BRIEF DESCRIPTION OF THE INVENTION

To this end, a subject of the invention is a (meth)acrylic mixture for impregnating a fibrous substrate, primarily characterized in that it comprises:
  a) a first dispersion comprising at least one (meth)acrylic polymer obtained by emulsion polymerization of one or more (meth)acrylic monomers,
  b) a second dispersion comprising at least one flame retardant.

According to other, optional characteristics of the (meth)acrylic mixture:
  the (meth)acrylic polymer of the first dispersion is selected from polyalkyl methacrylates or polyalkyl acrylates;
  the (meth)acrylic monomers of the first dispersion are selected from acrylic acid, methacrylic acid, acrylic alkyl monomers, methacrylic alkyl monomers and mixtures thereof;
  the (meth)acrylic monomers of the first dispersion are selected from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and mixtures thereof;

the flame retardant of the second dispersion is selected from:
phosphorus derivative additives such as phosphinates, diphosphinates, phosphonates, phosphates, red phosphorus, ammonium polyphosphates, or mixtures thereof,
hydrated inorganic fillers such as metal hydroxides.

The phosphorus derivative additives are selected from the phosphinates or diphosphinates having the formulae (I) or (II) below:

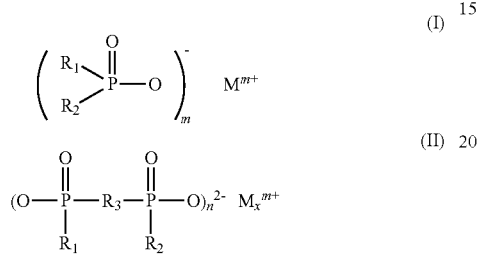

in which:
$R_1$ and $R_2$ denote linear or branched $C_1$-$C_6$ alkyl groups, and/or aryl groups;
$R_3$ denotes a linear or branched $C_1$-$C_{10}$ alkylene group, $C_6$-$C_{10}$ arylene group, or alkylarylene or arylalkylene group;
M denotes Mg, Ca, Al, Sb, Sn, Ge, Ti, Zn, Fe, Zr, Ce, Bi, Sr, Mn, Li, Na, K;
m is an integer between 1 and 4;
n is an integer between 1 and 4;
x is an integer between 1 and 4.

The phosphorus derivative additives have one of the formulae (III) or (IV) below:

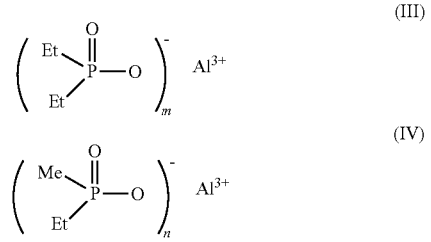

The second dispersion comprises between 30% by weight and 70% by weight, preferably between 40% and 60% by weight, of flame retardant.

The invention pertains additionally to a method for impregnating a fibrous substrate, primarily characterized in that it comprises a step of impregnating the fibrous substrate with a (meth)acrylic mixture, said (meth)acrylic mixture comprising:
a) a first dispersion comprising at least one (meth)acrylic polymer obtained by emulsion polymerization of one or more (meth)acrylic monomers,
b) a second dispersion comprising at least one flame retardant.

Advantageously, the step of impregnating said fibrous substrate is carried out in an impregnating bath.

According to other, optional characteristics of the impregnating method:
the impregnating method comprises a step of preparing the (meth)acrylic mixture by mixing a first dispersion, comprising at least one (meth)acrylic polymer obtained by emulsion polymerization of one or more (meth) acrylic monomers, and a second dispersion, comprising at least one flame retardant;
the fibrous substrate comprises glass fibers.

The invention pertains additionally to a method for manufacturing mechanical parts or structured elements, or articles, primarily characterized in that it comprises the following steps:
a) impregnating a fibrous substrate, in accordance with the impregnating method described above, with a (meth)acrylic mixture obtained by mixing a first dispersion comprising at least one (meth)acrylic polymer obtained by emulsion polymerization of one or more (meth)acrylic monomers, and a second dispersion comprising at least one flame retardant,
b) drying the fibrous substrate impregnated with the (meth)acrylic mixture,
c) consolidating the impregnated fibrous substrate obtained after the drying step.

According to other, optional characteristics of the manufacturing method:
the drying step is carried out at a temperature of between 20° C. and 200° C., preferably between 50° C. and 180° C., and more preferably between 80° C. and 150° C.;
the consolidating step is carried out at a temperature of between 100° C. and 350° C., preferably between 150° C. and 300° C., and more preferably between 180° C. and 250° C., it being possible for the temperature to be constant or variable during all or part of the consolidating step;
all or part of the consolidating step is carried out with a pressure of between 1 bar and 150 bar, preferably between 3 bar and 100 bar, and more preferably between 5 and 50 bar, it being possible for the pressure to be constant or variable during all or part of the consolidating step;
after the drying step, the impregnated fibrous substrate comprises between 5% by weight and 30% by weight, preferably between 5% and 20% by weight, and more preferably between 5% and 15% by weight of polymer matrix, relative to the total weight of impregnated fibrous substrate;
after the drying step, the impregnated fibrous substrate comprises between 5% by weight and 30% by weight, preferably between 15% by weight and 25% by weight, of flame retardant, relative to the total weight of impregnated fibrous substrate.

The invention pertains additionally to a mechanical part or a structured element or an article made of composite material, obtained by the implementation of the manufacturing method. The mechanical part is in particular a motor vehicle part, boat part, train part, sport article, airplane or helicopter part, spacecraft or rocket part, photovoltaic module part, wind turbine part, furniture part, construction or building part, telephone or cellphone part, computer or television part, printer and photocopier part.

DETAILED DESCRIPTION OF THE INVENTION

An "emulsion" is defined as being a liquid/liquid mixture of a liquid discontinuous phase in a liquid continuous phase, and more particularly a dispersion of an oily substance in the form of small droplets in an aqueous substance, said dispersion being stabilized by one or more chemical compounds such as surfactants or dispersants.

A "dispersion" is defined as being a colloidal system having a continuous liquid phase and a second, discontinuous phase which is distributed throughout the continuous phase.

A "(meth)acrylic monomer" is understood as any type of acrylic and methacrylic monomer.

A "(meth)acrylic polymer" is understood as a polymer essentially comprising (meth)acrylic monomers, which represent at least 50% by weight or more of the (meth)acrylic polymer.

The term "flame retardant" as used relates to a substance, additive or filler which is capable of retarding the inflammation of a material so as to enhance its fire resistance.

The invention concerns a (meth)acrylic mixture for impregnating a fibrous substrate, characterized in that it comprises:
  a) a first dispersion comprising at least one (meth)acrylic polymer obtained from one or more (meth)acrylic monomers,
  b) a second dispersion comprising at least one flame retardant.

The two dispersions are advantageously aqueous dispersions.

The (meth)acrylic mixture is obtained from the mixing of the first dispersion and of the second dispersion. The mixing of a (meth)acrylic dispersion and of a dispersion with flame retardant enables optimum impregnation of the fibrous substrate, with the polymer matrix surrounding each fiber of the fibrous substrate, and positioning of the flame retardant at the surface of said fibrous substrate. Moreover, the flame retardant adheres outstandingly to the fibrous substrate.

The First Dispersion

This first dispersion is advantageously an aqueous dispersion.

The (Meth)Acrylic Polymer

The (meth)acrylic polymer may be selected from polyalkyl methacrylates or polyalkyl acrylates. According to one preferred embodiment of the invention, the (meth)acrylic polymer is polymethyl methacrylate (PMMA). It should be understood hereinafter that polymethyl methacrylate (PMMA) may denote a methyl methacrylate (MMA) homopolymer or a copolymer of MMA, or mixtures thereof.

More particularly, the polymer may be a mixture of at least two MMA homopolymers having a different molecular weight, or a mixture of at least two MMA copolymers having an identical monomer composition and a different molecular weight, or a mixture of at least two MMA copolymers having a different monomer composition. It may also be a mixture of at least one MMA homopolymer and at least one MMA copolymer.

More particularly, the (meth)acrylic polymer may be functionalized, in that it may comprise one or more reactive functional groups intended for reaction with the fibrous substrate when the latter is impregnated with the (meth)acrylic mixture.

The (meth)acrylic polymer is preferably obtained by emulsion polymerization of one or more (meth)acrylic monomers. Emulsion polymerization allows excellent control of the reaction via the reaction temperature. Such polymerization, moreover, is generally rapid and enables high conversion rates, and polymers which possess high molecular masses.

The (Meth)Acrylic Monomers

The (meth)acrylic monomers from which the (meth)acrylic polymer can be obtained by emulsion polymerization are selected from acrylic acid, methacrylic acid, acrylic alkyl monomers, methacrylic alkyl monomers and mixtures thereof.

The (meth)acrylic monomers are preferably selected from acrylic acid, methacrylic acid, acrylic alkyl monomers, methacrylic alkyl monomers and mixtures thereof, where the alkyl group can be linear, branched or cyclic and contains from 1 to 22 carbon atoms, preferably from 1 to 12 carbon atoms.

The (meth)acrylic monomers are advantageously selected from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and mixtures thereof.

The (meth)acrylic monomers are more advantageously selected such that at least 50% by mass of the (meth)acrylic monomers consist of methyl methacrylate, and more advantageously that 60% by mass of the (meth)acrylic monomers consist of methyl methacrylate.

The Surfactant

The first dispersion further comprises one or more surfactants. This may in particular be one or more ionic or nonionic surfactants. It may more particularly be one or more anionic, cationic, zwitterionic, or nonionic surfactants, or a mixture thereof.

The anionic surfactants are selected from sulfates, ether sulfates, sulfonates or phosphates of alkoxylated fatty alcohols. Similarly, the nonionic surfactants are selected from ethoxylated fatty alcohols, ethoxylated alkylphenol derivatives, copolymers of ethylene oxide and of propylene oxide. The surfactants may also be a combination of at least one anionic surfactant and at least one nonionic surfactant as described above.

The percentage by mass of surfactant relative to the total weight of monomer mixture is preferably between 0.5% by weight and 5% by weight and more preferably between 0.5% by weight and 3% by weight.

The Radical Initiator

The polymerization initiators are radical polymerization initiators which are preferably water-soluble, or radical polymerization initiators which are fat-soluble or partially fat-soluble.

The water-soluble radical polymerization initiators are, in particular, sodium, potassium or ammonium persulfates, used alone or in the presence of reducing agents such as sodium metabisulfites or hydrosulfites, sodium thiosulfate, sodium formaldehyde-sulfoxylate, a mixture of disodium salt of 2-hydroxy-2-sulfinoacetic acid, sodium sulfite and disodium salt of 2-hydroxy-2-sulfoacetic acid, or else a mixture of disodium salt of hydroxysulfinoacetic acid and disodium salt of hydroxysulfoacetic acid.

The fat-soluble or partially fat-soluble radical polymerization initiators are, in particular, peroxides or hydroperoxides and derivatives of azobisisobutyronitrile. The peroxides or hydroperoxides are used in combination with the reducing agents described above so as to lower their activation temperature.

The percentage by mass of initiator relative to the total weight of monomer mixture is preferably between 0.05% by weight and 3% by weight, preferably between 0.1% by weight and 2% by weight.

The Second Dispersion

This second dispersion is advantageously an aqueous dispersion.

Flame Retardant

The flame retardant is preferably selected from:
phosphorus derivative additives such as phosphinates, diphosphinates, phosphonates, phosphates, red phosphorus, ammonium polyphosphates, or mixtures thereof,
hydrated inorganic fillers such as metal hydroxides.

The phosphorus derivative additives are more particularly selected from the phosphinates or diphosphinates having the formulae (I) or (II) below:

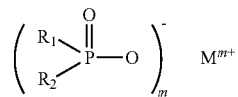
(I)

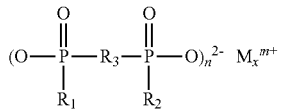
(II)

in which:
$R_1$ and $R_2$ denote linear or branched $C_1$-$C_6$ alkyl groups, and/or aryl groups;
$R_3$ denotes a linear or branched $C_1$-$C_{10}$ alkylene group, $C_6$-$C_{10}$ arylene group, or alkylarylene or arylalkylene group;
M denotes Mg, Ca, Al, Sb, Sn, Ge, Ti, Zn, Fe, Zr, Ce, Bi, Sr, Mn, Li, Na, K;
m is the number of positive charges and is an integer between 1 and 4;
n is an integer between 1 and 4;
x is an integer between 1 and 4.

It is also possible to combine two or more phosphorus derivative additives of formula (I) and/or (II). Advantageously, M denotes Ca, Al or Zn. Preferably, M denotes Al.

$R_1$ and $R_2$ are preferably alkyl groups such as, for example, methyl, ethyl, n-propyl, isopropyl, n-butyl, tert-butyl, n-pentyl groups, and/or phenyl groups.

$R_3$ is preferably the methylene, ethylene, n-propylene, isopropylene, n-butylene, tert-butylene, n-pentylene, n-octylene or n-dodecylene group. It may also be the phenylene, methylphenylene, ethylphenylene, tert-butylphenylene, methylnaphthylene, phenyl ethylene, phenylpropylene or naphthalene group.

Preference is given to using a phosphorus derivative of formula (I) in which M denotes Al and $R_1$ and $R_2$ both denote a $C_1$-$C_6$ alkyl group. $R_1$ and $R_2$ preferably are both ethyl groups or else an ethyl group and a methyl group, meaning that the phosphorus derivative additive corresponds to a product of formula (III) or (IV):

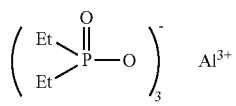
(III)

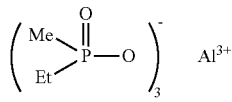
(IV)

Preferably, in order to obtain a homogeneous distribution of the (meth)acrylic mixture in the fibers of the fibrous substrate at the time of impregnation, the phosphorus derivative additive is in the form of particles having a mean diameter $D_{50}$ of between 0.5 and 10 μm, advantageously between 1 and 5 μm. This mean diameter $D_{50}$ of the particles is measured by laser diffraction granulometry, by means of an instrument from the Microtrac range (registered trademark). To estimate the mean diameter of the particles, a measurement is made of the volume-mean diameter $D_{50}$ or D(v;0.5), which corresponds to the particle size for which 50% of the sample has a size smaller than this size and 50% of the sample has a size greater than this size. This size is also referred to as volume-mean diameter, and is connected to the mass-median diameter via the density of the particles, assuming a density which is independent of the size of the particles.

The hydrated inorganic fillers are essentially metal hydroxides, which take the form more particularly of aluminum trihydrate ($Al(OH)_3$) or magnesium hydroxide ($Mg(OH)_2$). The filler is preferably aluminum trihydrate ($Al(OH)_3$).

Thermal degradation of the metal hydroxides is accompanied by their endothermic dehydration. The liberation of water cools the composite material and dilutes the gases in the flame zone, thereby retarding inflammation. Moreover, at the end of their thermal degradation, a metal oxide layer of $Al_2O$ or MgO forms in the composite material, and acts as a heat shield.

Preferably, in order to obtain effective dispersion in the (meth)acrylic dispersion and a uniform distribution in the fibers of the fibrous substrate at the time of impregnation, the flame-retardant metal hydroxide takes the form of particles having a mean diameter $D_{50}$ of between 0.5 and 10 μm, advantageously between 1 and 5 μm.

Preferably, so that the viscosity of the second dispersion and then the viscosity of the (meth)acrylic mixture are sufficiently low to allow optimum impregnation of the fibrous substrate, the percentage by mass of the flame retardant in the second dispersion is between 30 and 70%, preferably between 40% by weight and 60% by weight, relative to the total weight of the second dispersion.

The Dispersant

In order to obtain a stable dispersion of flame retardant in water, said flame retardant is combined with a dispersant. Any dispersant may be used that enables a stable dispersion of flame retardant as described in water to be obtained.

The percentage by mass of the dispersant in the second dispersion is preferably between 0.01% and 5%, preferably between 0.01% and 1%, and more preferably between 0.01% and 0.5%.

A dispersant is an adjuvant which has the property of maintaining particles in dispersion.

The dispersant is either a polymer or a surfactant. The dispersant enhances the separation of the particles in the dispersion. The dispersant prevents the flocculation or agglomeration of these particles, in other words their regrouping as coarser particles, which could in that case easily settle and lead to phase separation and/or precipitation of the particles.

The Fibrous Substrate

As regards the fibrous substrate, mention may be made of fabrics, felts or nonwovens, which may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear fibers. The fibers may be discontinuous or continuous. The fibers may be arranged randomly or in the form of a continuous filament parallel to each other. A fiber is defined by its aspect ratio, which is the ratio between the length and the diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two-dimensional form corresponds to fibrous mats or nonwoven reinforcements or woven rovings or fiber bundles, which may also be braided.

The three-dimensional form corresponds, for example, to fibrous mats or nonwoven reinforcements or fiber bundles or mixtures thereof which are stacked or folded, an assembly of the two-dimensional form in the third dimension.

The fibrous material may be natural or synthetic in its origins. Natural material includes plant fibers, wood fibers, animal fibers or mineral fibers.

Natural fibers are, for example, sisal, jute, hemp, flax, cotton, coconut fibers and banana fibers. Animal fibers are, for example, wool or hair.

Synthetic material includes polymer fibers selected from thermosetting polymer fibers, thermoplastic polymer fibers or mixtures thereof.

The polymer fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be selected from glass fibers, particularly of type E, R or S2, carbon fibers, boron fibers or silica fibers.

The fibrous substrate of the present invention is selected from plant fibers, wood fibers, animal fibers, mineral fibers, synthetic polymer fibers, glass fibers, carbon fibers or mixtures thereof. The fibrous substrate is preferably selected from mineral fibers. More preferably, the fibrous substrate is selected from glass fibers.

The Method for Impregnating a Fibrous Substrate

The method for impregnating the fibrous substrate comprises a step of impregnating said fibrous substrate with the (meth)acrylic mixture described above, this mixture comprising:
a) the first dispersion comprising at least one (meth)acrylic polymer obtained by emulsion polymerization of one or more (meth)acrylic monomers,
b) the second dispersion comprising at least one flame retardant.

Prior to the step of impregnating the fibrous substrate, the impregnating method comprises a step of preparing the (meth)acrylic mixture. This step comprises the preparation of the first dispersion and of the second dispersion. The first dispersion initially comprises one or more (meth)acrylic monomers intended for emulsion polymerization so as to form a (meth)acrylic polymer.

The step of preparing the (meth)acrylic mixture further comprises the mixing of the first dispersion and the second dispersion so as to prepare the (meth)acrylic mixture. Since the (meth)acrylic mixture is obtained from two stabilized dispersions, it is itself stabilized.

Accordingly, the resulting (meth)acrylic mixture comprises at least one (meth)acrylic polymer and at least one flame retardant, said (meth)acrylic polymer and said flame retardant being as defined above.

The step of impregnating the fibrous substrate with the (meth)acrylic mixture is carried out preferably by soaking or immersing the fibrous substrate in the (meth)acrylic mixture, or else by spraying the (meth)acrylic mixture onto the fibrous substrate. Impregnation may be carried out with or without addition of pressure.

The Method for Manufacturing Parts Made of Composite Material

The method for manufacturing mechanical parts or structured elements, or articles, comprises:
a) the impregnation of the fibrous substrate with a (meth)acrylic mixture obtained by mixing the first dispersion, comprising at least one (meth)acrylic polymer obtained by emulsion polymerization of one or more (meth)acrylic monomers, and the second dispersion, comprising at least one flame retardant,
b) the drying of the fibrous substrate impregnated with the (meth)acrylic mixture,
c) the consolidation of the fibrous substrate impregnated with the (meth)acrylic mixture, obtained after the drying step.

The step of drying the fibrous substrate impregnated with the (meth)acrylic mixture is carried out by increasing the temperature. The drying temperature is preferably between 20° C. and 200° C., preferably between 50° C. and 180° C., and more preferably between 80° C. and 150° C.

The drying step allows the water to evaporate and enables an impregnated fibrous structure to be obtained with an outer layer in which the polymer particles have fused and form a polymer matrix surrounding each fiber of said fibrous substrate. The porosity and the defects of the composite-material parts subsequently manufactured are thereby reduced, and the mechanical properties of said composite-material parts are enhanced.

The drying step is advantageously carried out in an oven. It is also possible to use a kiln or heating rollers, or any other device envisaged for this purpose.

During the consolidating step, the impregnated fibrous substrate obtained after drying is compressed at high temperature so as to increase the cohesion of the polymer matrix. This produces a composite-material part possessing good mechanical and flame-retardancy properties, by virtue of the consolidated polymer matrix surrounding each fiber of the fibrous substrate.

During the consolidating step, the temperature is preferably between 100° C. and 350° C., preferably between 150° C. and 300° C., and more preferably between 180° C. and 250° C. Such a temperature may be constant or variable during all or part of the consolidating step. The temperature is preferably constant during the consolidating step.

The consolidating step allows a composite-material part to be obtained in the form desired by the user. The part is preferably obtained by consolidating a plurality of plies of impregnated fibrous substrate obtained after drying, so as to join them to one another. The plies are assembled in a mold which allows the final part to be shaped. The shape obtained is also dependent on the number of plies used and on the arrangement of the plies relative to one another during consolidation.

The plies are positioned in a mold and then heated at high temperature, said temperature being greater than the glass transition temperature of the (meth)acrylic polymer, and preferably greater than the drying temperature. Such heating allows the formation of interengagements of macromolecular chains of the (meth)acrylic polymer, thereby resulting in greater cohesion of the polymer matrix.

The consolidation of the impregnated fibrous substrate after drying is advantageously carried out under pressure, said pressure being applied during all or part of the consolidating step.

The pressure applied during the consolidating step is preferably between 1 bar and 150 bar, preferably between 3 bar and 100 bar, and more preferably between 5 bar and 50 bar. Advantageously, the pressure applied increases during the course of the consolidating step. More preferably, the pressure applied increases during the course of the consolidating step between 1 bar and 150 bar, preferably between 3 bar and 100 bar, and more preferably between 5 bar and 50 bar.

The consolidating time is preferably between 1 minute and 20 minutes, preferably between 3 minutes and 10 minutes.

The consolidating step is preferably carried out with the aid of a hydraulic press, more particularly a hydraulic press having heating plates disposed between which is a mold containing the plies of fibrous substrate impregnated with polymer matrix according to the invention. After heating and pressurization, followed by cooling, the composite material is obtained by demolding.

Subsequent to the consolidating step, it is possible to carry out a second impregnation of the fibrous substrate with a polymer resin. Such a resin may be thermosetting or thermoplastic. Thermosetting resins include, in particular, polyester resins, vinyl ester resins or epoxy resins. Thermoplastic resins include, in particular, methacrylic resins, polyamide resins and acrylic resins.

The mechanical parts or the structured elements or the articles made of composite material may be obtained by various processes subsequent to the consolidating step. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

The preferred manufacturing processes for the manufacture of mechanical parts or structural elements or articles based on composite material are processes wherein the (meth)acrylic mixture is transferred to the fibrous substrate by impregnation of said fibrous substrate in a mold, more preferably in a closed mold.

The manufacturing method according to the invention is preferably implemented by compression molding, resin transfer molding (RTM), in an autoclave, or by infusion.

Resin transfer molding is a process which uses a two-sided molding set which forms the two surfaces of a composite material. The bottom side is a rigid mold. The top side may be a rigid or flexible mold. Flexible molds may be made from composite materials, silicone or extruded polymer films such as nylon. The two sides fit together to form a molding cavity. The distinctive characteristic of resin transfer molding is that the fibrous substrate is placed into this cavity and that the molding set is closed before the (meth) acrylic mixture is introduced. Resin transfer molding includes numerous variations which differ in the mechanics of introduction of the (meth)acrylic mixture into the fibrous substrate in the molding cavity. These variations range from vacuum infusion molding to vacuum-assisted resin transfer molding (VARTM). This process may be carried out at ambient or elevated temperature.

A (meth)acrylic dispersion or syrup is particularly well suited to the infusion process, owing to its very low viscosity. According to this process, as described for example in patent application WO13056845, the (meth)acrylic syrup is drawn into the fibrous substrate present in a special mold by application of a gentle vacuum. The fibrous substrate is infused and completely impregnated with the (meth)acrylic mixture. An advantage of this process is the high quantity of fibrous material in the eventual composite material obtained.

The invention also concerns a mechanical part or a structured element or an article made of composite material, obtained by the implementation of the manufacturing method according to the invention.

Such a part is, in particular, a motor vehicle part, boat part, train part, sport article, airplane or helicopter part, spacecraft or rocket part, photovoltaic module part, wind turbine part, furniture part, construction or building part, telephone or cellphone part, computer or television part, printer and photocopier part.

EXAMPLES OF IMPLEMENTING METHODS FOR IMPREGNATING A FIBROUS SUBSTRATE AND OF MANUFACTURING COMPOSITE-MATERIAL PARTS ACCORDING TO THE INVENTION

Example 1: Impregnation of a Glass Cloth Fibrous Substrate with a Dispersion Comprising a Flame Retardant Preparation of the dispersion of flame-retardant fillers: a large-sized container open to the air is charged with 1 kg of distilled water, followed by addition of 1 g of Rheoperse® 3310, a stabilizer produced and sold in particular by Arkema. Stirring of the mixture is commenced, and then 1 kg of ATH MOLDX P18 filler, an aluminum trihydrate produced and sold in particular by HUBER, is added gently. The mixture is subsequently stirred for 10 minutes.

Impregnation of the fibrous substrate: the fibrous substrate is a taffeta fabric made from 600T glass fibers from Chomarat, with a mass per unit area of 600 g/m$^2$. The fibrous substrate is impregnated manually by immersing it in a bath of the dispersion prepared above, without draining. The impregnated fibrous substrate obtained is dried at 80° C. for 10 minutes in an oven, then weighed after drying. The weighing indicates a percentage by mass of ATH of 20% by weight relative to the total weight of impregnated fibrous substrate.

It is observed, however, that the impregnated substrate obtained has poor handling qualities, and the adhesion of the ATH fillers to said impregnated fibrous substrate is only minimal.

Example 2: Impregnation of a Glass Cloth Fibrous Substrate with a (Meth)Acrylic Mixture of Flame-Retardant Character, and Manufacture of a Composite-Material Part Preparation of the (meth)acrylic mixture: the dispersion of flame-retardant fillers prepared in example 1 is mixed with a dispersion of polymethyl methacrylate (PMMA). The polymer contained in the methacrylic dispersion is a methyl methacrylate polymer referenced 30D54AE, which is manufactured and sold by Arkema, with a molar mass of 120 000 g/mol and a glass transition temperature of 115.7° C.

Impregnation of the fibrous substrate and drying of the impregnated fibrous substrate: a taffeta fabric made of 600T glass fibers, identical to that of example 1, is impregnated with the (meth)acrylic mixture prepared above, without draining. The impregnated fibrous substrate obtained is dried at 80° C. for 10 minutes in an oven, then weighed after drying. The weighing indicates a percentage by mass of (meth)acrylic mixture of 35% by weight relative to the total weight of impregnated fibrous substrate, giving 11.5% by mass of ATH and 23.5% by mass of 30D54AE polymer relative to the total mass of impregnated fibrous substrate. Impregnation is ideal, such that the impregnated substrate obtained is readily handleable, and the adhesion of the ATH fillers to said impregnated fibrous substrate is excellent.

Consolidation of the impregnated fibrous substrate: a first sheet of Kapton®, a polyimide film with high thermal stability developed and sold in particular by DuPont, is placed onto a first steel plate. A mold is then positioned on the Kapton® sheet, the mold being lower in thickness than the eventual composite-material part, such that the heating plates bear against the impregnated fibrous substrate and not against the mold, so as to ensure effective compression. Placed within the mold are four plies of fibrous substrate impregnated with polymer matrix. A second sheet of Kapton® is then placed onto the plies, followed by a second steel plate on the second sheet of Kapton®.

The resulting assembly is installed between the two heating plates of the hydraulic press, said heating plates having a temperature of 250° C. The heating plates are brought into contact with one another, without pressure, for 3 minutes. A pressure of 20 bar is then added for 3 minutes. The plates are subsequently cooled by virtue of a cold-water valve; heating is discontinued and the pressure is maintained. When the temperature of the plates reaches 60° C., the cold-water valve is closed and an air valve is opened so as to evacuate the water from the plates. The assembly is extracted from the heating plates, and the composition-material part is demolded.

The invention claimed is:

1. A (meth)acrylic mixture for impregnating a fibrous substrate, comprising: a) a first aqueous dispersion comprising at least one (meth)acrylic polymer obtained by emulsion polymerization of one or more (meth)acrylic monomers, and b) a second stable aqueous dispersion comprising at least one flame retardant, combined with a dispersant, wherein the mass percentage of the dispersant in the second stable aqueous dispersion is between 0.01% and 5%, and wherein in the second stable aqueous dispersion, the at least one flame retardant is in the form of particles having a mean diameter $D_{50}$ of between 0.5 and 10 µm.

2. The (meth)acrylic mixture as claimed in claim 1, wherein the at least one (meth)acrylic polymer of the first aqueous dispersion is selected from the group consisting of polyalkyl methacrylates and polyalkyl acrylates.

3. The (meth)acrylic mixture as claimed in claim 1, wherein the one or more (meth)acrylic monomers of the first aqueous dispersion are selected from the group consisting of acrylic acid, methacrylic acid, acrylic alkyl monomers, methacrylic alkyl monomers and mixtures thereof.

4. The (meth)acrylic mixture as claimed in claim 1, wherein the one or more (meth)acrylic monomers of the first aqueous dispersion are selected from the group consisting of methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and mixtures thereof.

5. The (meth)acrylic mixture as claimed in claim 1, wherein the at least one flame retardant of the second stable aqueous dispersion is selected from the group consisting of: phosphorus derivative additives, phosphinates, diphosphinates, phosphonates, phosphates, red phosphorus, ammonium polyphosphates, and mixtures thereof, " hydrated inorganic fillers, and metal hydroxides.

6. The (meth)acrylic mixture as claimed in claim 5, wherein the phosphorus derivative additives are selected from the group consisting of phosphinates and diphosphinates having the formulae (I) or (II) below:

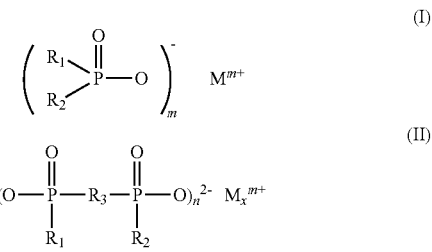

in which:
R$_1$ and R2 denote linear or branched $C_1$-$C_6$ alkyl groups, and/or aryl groups;
$R_3$ denotes a linear or branched $C_1$-$C_{10}$ alkylene group, $C_6$-$C_{10}$ to arylene group, or alkylarylene or arylalkylene group;
M denotes Mg, Ca, Al, Sb, Sn, Ge, Ti, Zn, Fe, Zr, Ce, Bi, Sr, Mn, Li, Na, K;
m is the number of positive charges and is an integer between 1 and 4;
n is an integer between 1 and 4;
x is an integer between and 4.

7. The meth(acrylic) mixture as claimed in claim 5, wherein the phosphorus derivative additives have one of the formulae (III) or (IV) below:

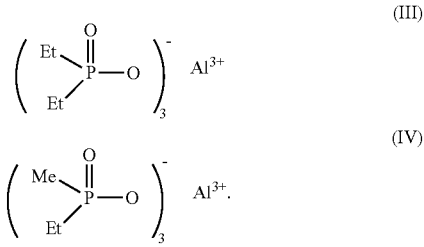

8. The (meth)acrylic mixture as claimed in claim 1, wherein the second stable aqueous dispersion comprises between 30% by weight and 70% by weight of the at least one flame retardant, relative to the total weight of the second stable aqueous dispersion.

* * * * *